(12) United States Patent
Miyazaki et al.

(10) Patent No.: US 7,200,682 B2
(45) Date of Patent: Apr. 3, 2007

(54) TIME STAMP GENERATING SYSTEM

(75) Inventors: Kunihiko Miyazaki, Yokohama (JP); Seiichi Susaki, Yokohama (JP); Kazuo Takaragi, Ebina (JP); Hiroshi Yoshiura, Tokyo (JP); Takeshi Matsuki, Musashino (JP); Hisashi Toyoshima, Hachioji (JP); Mitsuru Iwamura, Tokyo (JP); Tsutomu Matsumoto, Yokohama (JP); Ryoichi Sasaki, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 703 days.

(21) Appl. No.: 10/223,677

(22) Filed: Aug. 20, 2002

(65) Prior Publication Data

US 2003/0212828 A1 Nov. 13, 2003

(30) Foreign Application Priority Data

May 8, 2002 (JP) .............................. 2002-132265

(51) Int. Cl.
*G06F 15/16* (2006.01)
(52) U.S. Cl. .................... 709/248; 709/229; 713/178; 380/278
(58) Field of Classification Search ............... 713/178; 709/248, 229; 370/350; 705/71
See application file for complete search history.

(56) References Cited

U.S. PATENT DOCUMENTS

| | | | |
|---|---|---|---|
| 5,136,643 A | | 8/1992 | Fischer |
| 6,081,899 A * | | 6/2000 | Byrd ................................ 726/2 |
| 6,209,090 B1 * | | 3/2001 | Aisenberg et al. ........... 713/178 |
| 6,510,513 B1 * | | 1/2003 | Danieli ......................... 713/156 |
| 6,603,857 B1 * | | 8/2003 | Batten-Carew et al. ....... 380/44 |
| 6,732,101 B1 * | | 5/2004 | Cook ............................ 707/10 |
| 6,895,507 B1 * | | 5/2005 | Teppler ......................... 726/19 |
| 6,898,709 B1 * | | 5/2005 | Teppler ....................... 713/178 |
| 6,915,423 B2 * | | 7/2005 | Lim et al. .................... 713/158 |
| 6,931,537 B1 * | | 8/2005 | Takura et al. ................ 713/178 |
| 6,959,387 B2 * | | 10/2005 | Walker et al. .............. 713/178 |
| 7,047,415 B2 * | | 5/2006 | Doyle et al. ................. 713/178 |
| 7,062,528 B2 * | | 6/2006 | Deguchi ....................... 709/203 |
| 2002/0129256 A1 * | | 9/2002 | Parmelee et al. ............ 713/158 |
| 2002/0143710 A1 * | | 10/2002 | Liu ............................... 705/75 |

FOREIGN PATENT DOCUMENTS

WO WO 01/63927 A1 8/2001

OTHER PUBLICATIONS

"Applied Cryptography, Second Edition", Bruce Schneier, pp. 44-46, 75-79, John Wiley & Sons, 1996.
"Handbook of Applied Cryptography", Alfred J. Menezes et al., pp. 39-41, CRC Press, 1997.
Schneier, B. "Applied Cryptography, Protocols, Algorithms, and Source Code in C, Time Stamping Services." Applied Cryptography, Protocols, Algorithms, and Source Code in C, New York, john Wiley & Sons, US, 1996, XP002240242, ISBN: 0-471-11709-9, pp. 75-78.

* cited by examiner

*Primary Examiner*—Abdullahi Salad
(74) *Attorney, Agent, or Firm*—McDermott Will & Emery LLP

(57) ABSTRACT

A time stamp generating system has a time distribution server for generating time data depending on time and a user PC for holding time certification objective digital data. The time distribution server generates time data corresponding to a time point and distributes the time data. The user PC calculates time stamp generating data by using the time certification objective data as an input, acquires the time data generated by the time distribution server, and processes the time data on the basis of the time stamp generating data to obtain a time stamp.

8 Claims, 13 Drawing Sheets

TIME STAMP GENERATING SYSTEM

BACKGROUND OF THE INVENTION

The present invention relates to techniques for time certification for digital data.

Conventionally, a time stamp technique has been available in which each user transmits digital data for which time is desired to be certified to a TSA (Time-stamping Authority) and the TSA generates time certification information (called a time stamp) on the basis of the digital data and time information at that point of time.

The conventional time stamp technique is detailed in a literature [AC] "Applied Cryptography Second Edition" by Bruce Schneier, John Wiley & Sons, Inc., 1996.

A method has also been available which utilizes, as the time certification information generated by the TSA, a digital signature, based on a secrete key by the TSA, for digital data received from a user and time information at a time point of time stamp issuance.

The time certified by the generated time stamp according to the prior arts as above corresponds to a point of time at which the TSA carries out a time stamp generating process and which is later than a time requested by the user. Especially when requests for time stamp generation are made concentrically to the TSA from many users within a short period of time, the delay is more aggravated or further increased. Also, in the event that the TSA fails to proceed with processing for some reasons, the user cannot obtain time certification for the digital data.

With electronic commerce transacted briskly and widely, a demand for a time stamp increases and the advent of an improved time stamp method or system has been desired.

SUMMARY OF THE INVENTION

The present invention provides method and system for generating a time stamp indicative of a time closer to that requested by a unit on the user side.

According to an embodiment of the present invention, method and system are provided in which a user side unit generates time certification information (time stamps) for digital data by utilizing given time information.

According to the invention, the user side unit determines time stamp generating data from digital data for which time is to be certified and designates and acquires partial data that is a part of time information generated by a time distribution server, thereby obtaining time certification information (a time stamp) for the digital data.

According to an embodiment of the invention, time data for calculating a time stamp is distributed from a time distribution server and the user side unit generates the time stamp by carrying out a process using a part of received time data that is determined in accordance with data for which time is to be certified or time certification objective data.

In a concrete example, a time stamp position designating function is defined in advance as a function common to the whole of a system. The user side unit calculates a time stamp position by processing the time certification objective data pursuant to the time stamp position designating function. Then, data of ΔL bytes beginning with a time stamp position in the distributed time data (called partial time data) is settled as a time stamp.

The time data as above is difficult to predict from another piece of time information and has so large a data size that cannot be memorized easily by the user side unit. The user side unit processes the aforementioned time data in accordance with a predetermined method using the digital data for which time is to be certified so as to convert that time data into data of a memorable size and the converted data is used as time certification information (a time stamp) for the certification objective digital data, whereby a user PC need not memorize all of received data. By making the time data have the above properties, forgery of past or old time stamps becomes difficult to achieve.

According to another embodiment of the invention, the user side unit determines data for generation of a time stamp from time certification objective data and makes a request to the time distribution server. The time distribution server, which has calculated time data for calculation of the time stamp, generates the time stamp on the basis of the time stamp generating data transmitted from the user's side unit and transmits the generated time stamp to the user side unit. This method makes the time distribution server free from carrying out a highly-loaded process for generating the time stamp from the time certification objective data.

Further, according to another embodiment of the invention, through a further process using the aforementioned generated time stamp and certification objective data, selection of another piece of time information and processing of the selected time information are carried out so that a new time stamp of a memorable data size may be obtained.

According to still another embodiment of the invention, a plurality of series of time information capable of being presented are prepared and through a predetermined method using the aforementioned generated time stamp and certification objective data, selection of time information at a different time from a different series of time information and processing of the selected time information are carried out so that a new time stamp of a memorable data size may be obtained.

These processes make forgery more difficult to achieve.

Other objects, features and advantages of the invention will become apparent from the following description of the embodiments of the invention taken in conjunction with the accompanying drawings.

DETAILED DESCRIPTION OF THE EMBODIMENTS (1) First Embodiment

An embodiment of the invention will now be described with reference to the accompanying drawings.

Figure 1:
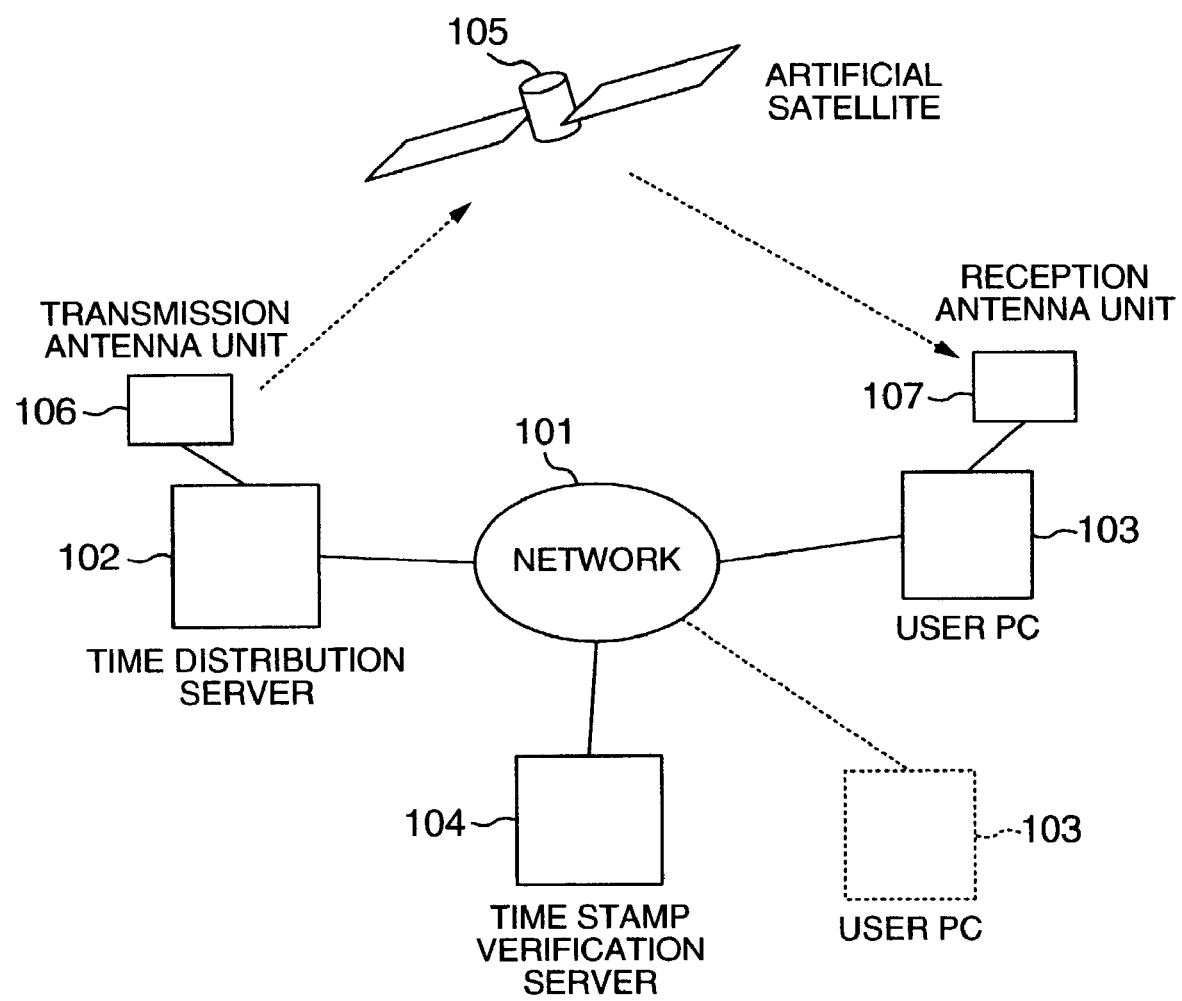
FIG. 1 is a schematic diagram of a system to which an embodiment of the invention is applied.

FIG. 1 schematically shows a system to which an embodiment of the invention is applied.

In the present system, a time distribution server 102 for distributing time information, a user PC 103 representing a single or a plurality of user side units for requesting time certification and a time stamp verification server 104 for verifying validity of a generated time stamp are interconnected through a network 101. The time distribution server 102 can transmit data to an artificial satellite 105 representing a distribution relay unit by way of a transmission antenna unit 106 representing a transmitter. The artificial satellite 105 broadcasts data received from the time distribution server 102 to the user PC 103. The user PC 103 can receive the data from the artificial satellite 105 by way of a reception antenna unit 107 representing a receiver.

The time distribution server 102 in the present embodiment plays the role of distributing, as time information, part of a pseudo-random number series generated on the basis of a certain seed value, which part is determined depending on the current time and referred to as a pseudo-random number, to the user PC 103 via the artificial satellite 105. The pseudorandom number representing the time information will hereinafter be called "time data". It is desirable that the data size of time data distributed at that point of time be so designed as to be large enough to make it very difficult for an unauthorized person who does not know the seed value of random number to memorize the time data.

Figure 2:
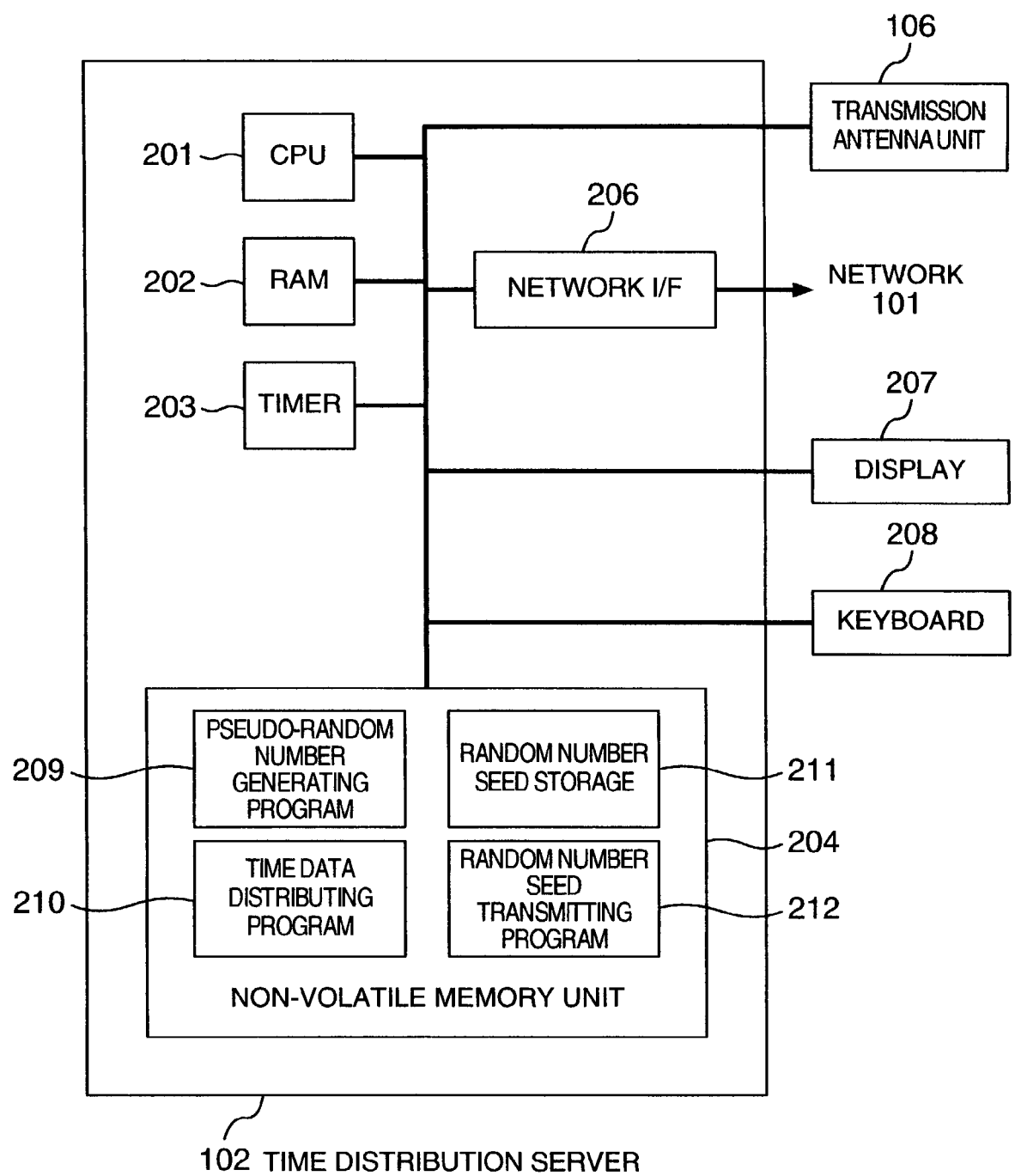
FIG. 2 is a block diagram showing the construction of a time distribution server in a first embodiment.

FIG. 2 shows the construction of the time distribution server 102 in the present embodiment.

The time distribution server 102 includes a CPU 201, a RAM 202, a timer 203, a non-volatile memory unit 204, the transmission antenna unit 106, a network I/F 206, a display 207 and a keyboard 208, these components being interconnected through signal lines such as buses.

Stored in the non-volatile memory unit 204 are a pseudo-random number generating program 209, a time data distributing program 210 and a random number seed transmitting program 212. The non-volatile memory unit 204 further includes a random number seed storage 211 from/to which a random number seed utilized in the pseudo-random number generating program 209 is read/written as necessary.

The CPU 201 executes the programs stored in the non-volatile memory unit 204 on the RAM 202 to implement them as functioning. The aforementioned programs may be introduced from an external unit to the non-volatile memory unit 204 by way of a memory medium or a communication medium. The timer 203 delivers the current time information as necessary. The timer 203 can obtain the present time to be delivered by measuring a lapse of time from a preset time by means of an oscillator if it can keep time accuracies requested by the user PC 103 or by providing an electric wave receiver to utilize electric wave time. Alternatively, the above two methods may be used in combination. The transmission antenna unit 106 follows a command of CPU 201 based on the time data distributing program 210 to transmit, as necessary, time data to the artificial satellite 105. The network I/F 206 performs, as necessary, transmission/reception of information to/from another unit connected to network 101 such as the time stamp verification server 104.

Figure 3:
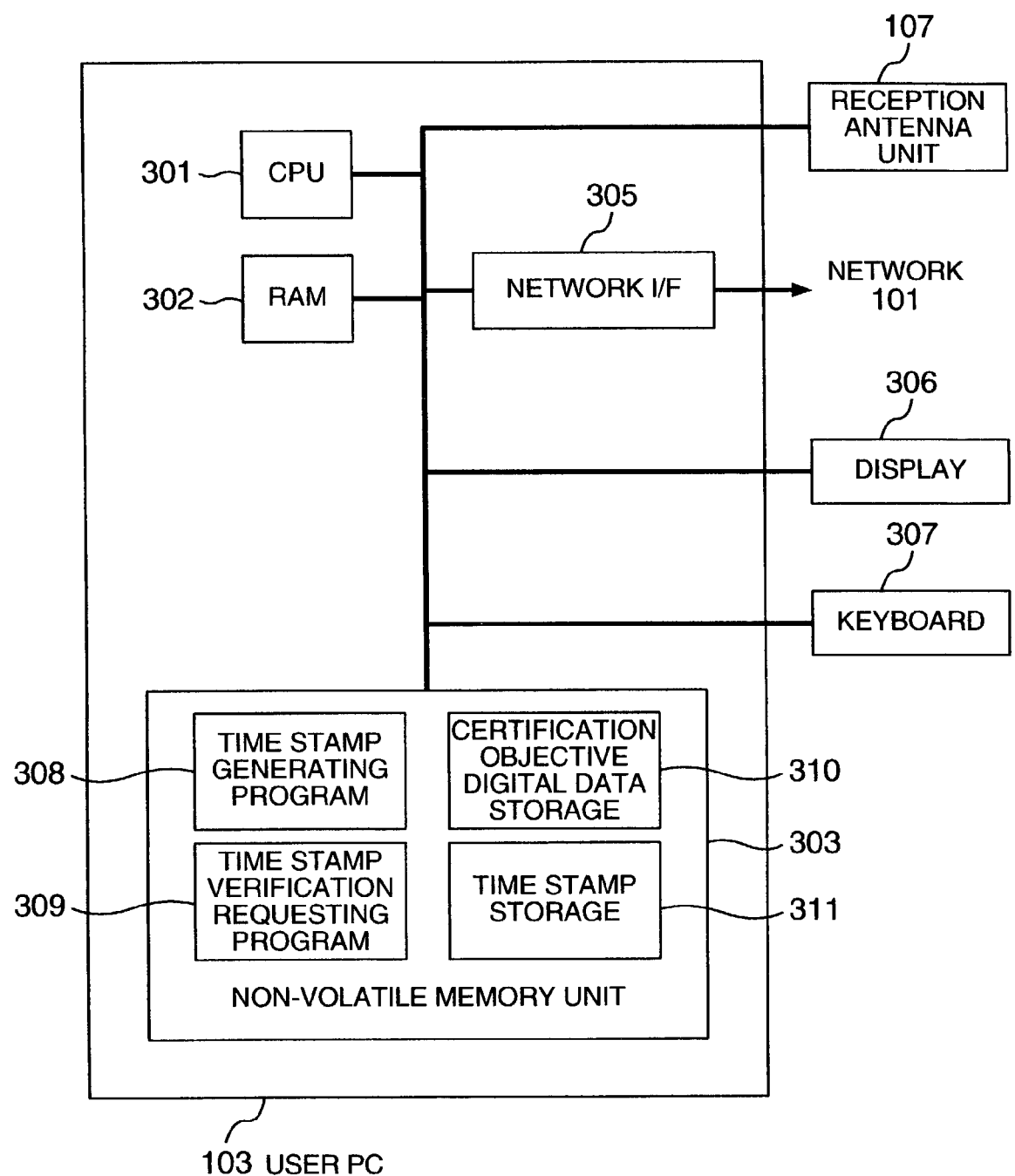
FIG. 3 is a block diagram showing the construction of a user PC in the first embodiment.

FIG. 3 shows the construction of the user PC 103 in the present embodiment. The user PC 103 in the present embodiment calculates a time stamp for digital data held by itself (data for which time is to be certified) on the basis of time data received from the artificial satellite 105 and holds a result. In the present embodiment, data utilized for calculation of time stamp is set to part of the received time data, which part is determined in accordance with the time certification objective data. For this reason, the user PC need not memorize all of the received data.

In the user PC 103, a CPU 301, a RAM 302, a non-volatile memory unit 303, the reception antenna unit 107, a network I/F 305, a display 306 and a keyboard 307 are interconnected through signal lines such as buses.

Stored in the non-volatile memory unit 303 are a time stamp generating program 308 and a time stamp verification requesting program 309. The non-volatile memory unit 303 further includes a certification objective digital data storage 310 and a time stamp storage 311 and data utilized in the time stamp generating program 308 or time stamp verification requesting program 309 is read/written from/to the storage 311, as necessary.

The CPU 301 executes the programs stored in the non-volatile memory unit 303 on the RAM 302 to implement them as functioning. The aforementioned programs may be introduced from an external unit to the non-volatile memory unit 303 by way of a memory medium or a communication medium. The reception antenna unit 107 follows a command of CPU 301 based on, for example, the time stamp generating program 308 and as necessary, receives from the artificial satellite 105 time data distributed from the time distribution server 102. The network I/F 305 performs, as necessary, transmission/reception of information to/from other units connected to the network 101 such as another user PC 103 and the time stamp verification server 104.

Figure 4:
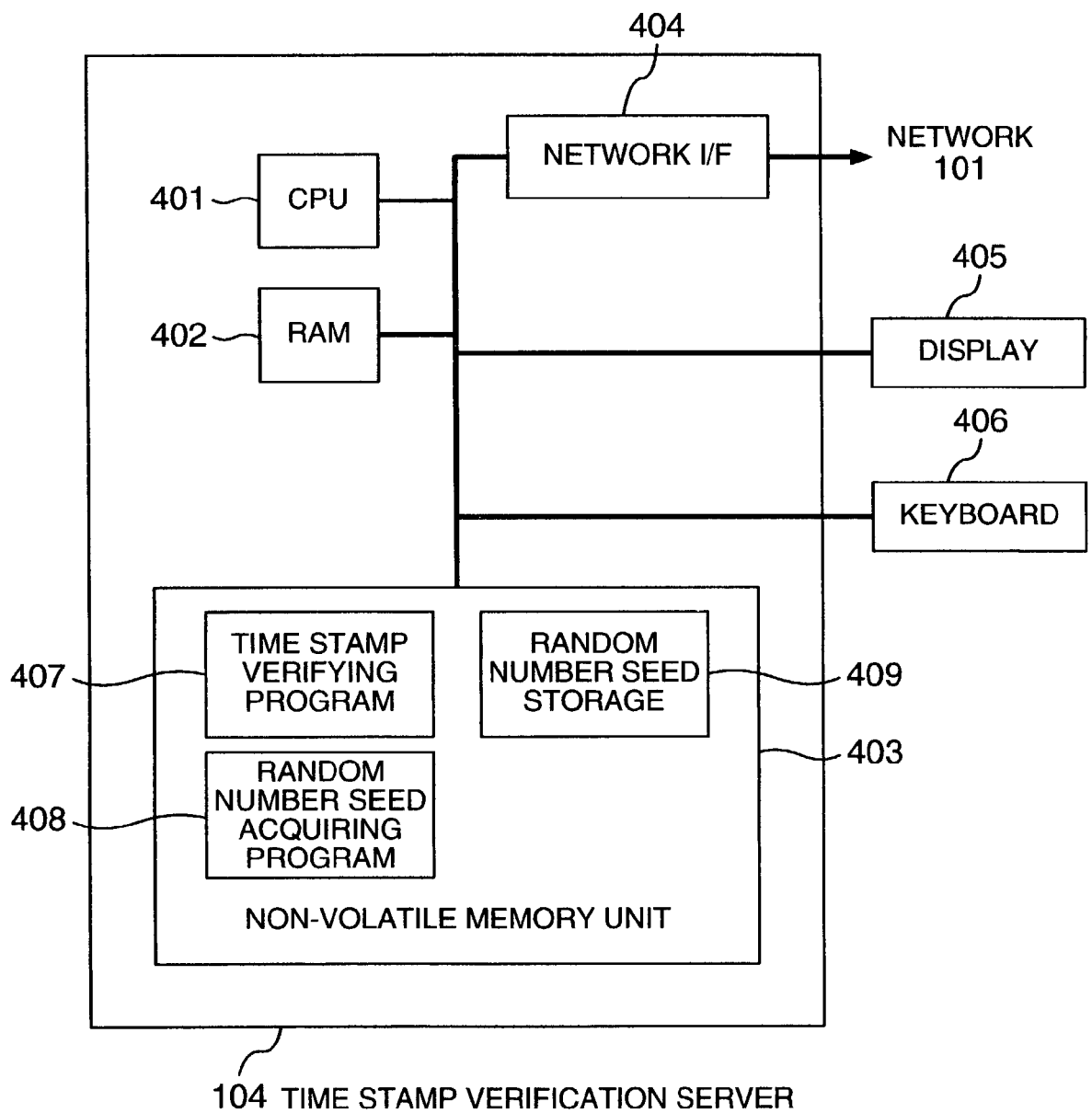
FIG. 4 is a block diagram showing the construction of a time stamp verification server in the first embodiment.

FIG. 4 shows the construction of the time stamp verification server 104 in the present embodiment. The time stamp verification server 104 in the present embodiment receives a request from the user PC 103 to verify a time stamp. For verification, data necessary for recalculating time data (for example, a random number seed) is obtained in advance from the time distribution server 102 and the thus obtained data is used to verify the validity of the time stamp.

In the time stamp verification server 104, a CPU 401, a RAM 402, a non-volatile memory unit 403, a network I/F 404, a display 405 and a keyboard 406 are interconnected through signal lines such as buses.

Stored in the non-volatile memory unit 403 are a time stamp verifying program 407 for receiving a request from the user PC 103 to verify the time stamp and a random number seed acquiring program 408 for acquiring a random number seed from the time distribution server 102. The non-volatile memory unit 403 further includes a random number seed storage 409 from/to which a random number seed utilized by the program is read/written as necessary.

The CPU 401 executes the programs stored in the non-volatile memory unit 403 on the RAM 402 to implement them as functioning.

The aforementioned programs may be introduced from an external unit to the non-volatile memory unit 403 by way of a memory medium or a communication medium.

Figure 5:
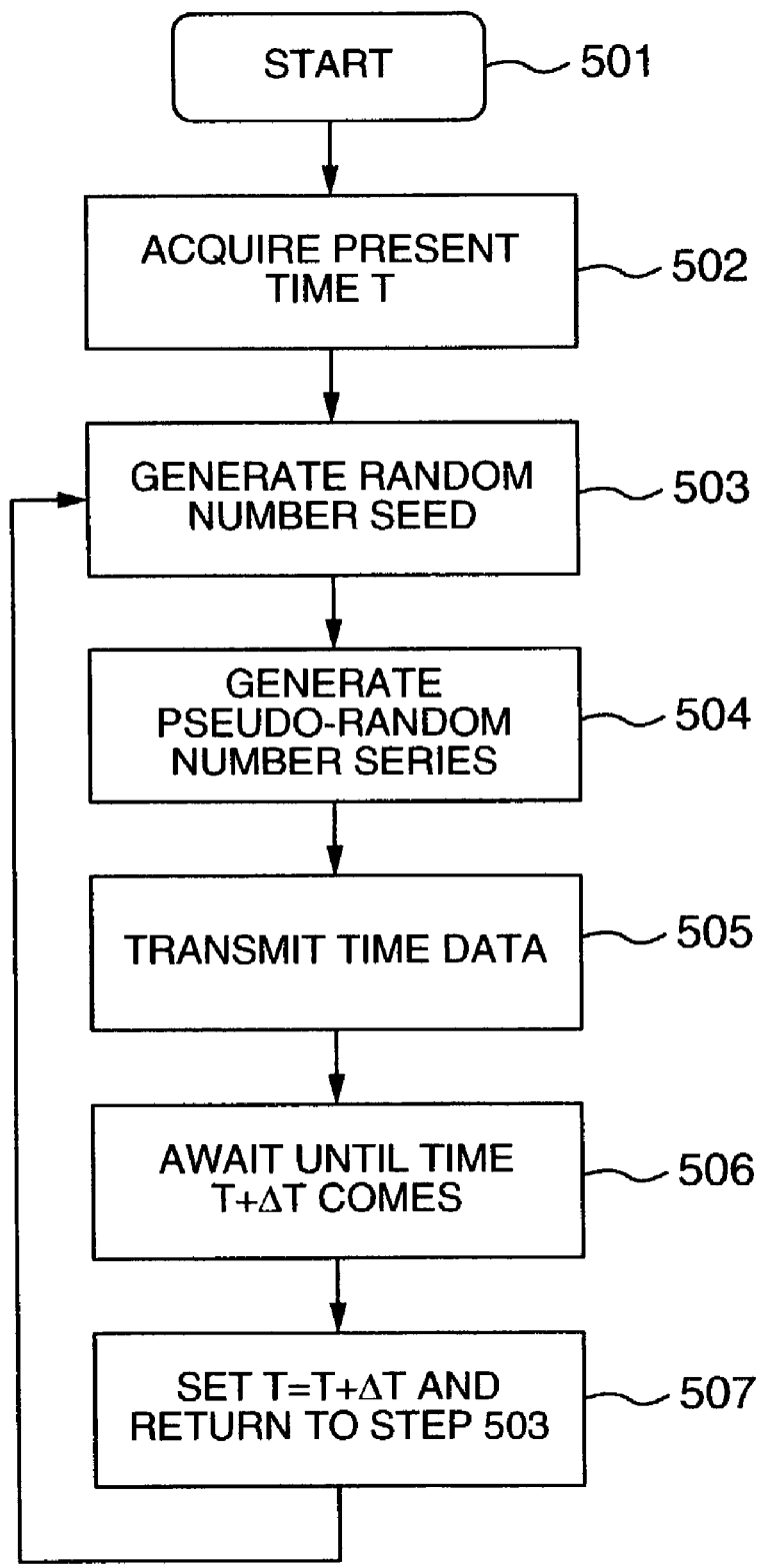
FIG. 5 is a diagram showing a process flow of time data generating/transmitting process by the time distribution server in the first embodiment.

FIG. 5 shows a process flow (implemented by the time data distributing program 210) of a time data generating/transmitting process by the time distribution server 102 in the present embodiment. Assumptively, the resolution of the time distributed by the time distribution server 102 is $\Delta T$ (for example, when $\Delta T=1$ second, a time stamp having an accuracy in a unit of second can be generated). It is also assumed that the size of a pseudo-random number (time data) at a certain time point is L bytes. The $\Delta T$ and L may be set to suitable values in accordance with requirements demanded by the present system and the security robustness.

Time Data Generating/Transmitting Process

Step 501: Start.
Step 502: Current time T is acquired by using the timer.
Step 503: A random number seed corresponding to the current time T is generated and stored in the random number seed storage 211.
Step 504: The pseudo-random number generating program 209 is executed by using the generated random number seed as an input to generate a pseudo-random number having a length of L bytes.
Step 505: Information concerning the present time T acquired in the step 502 and pseudo-random number of L bytes generated in the step 504 are put together to provide time data at time T which in turn is transmitted by using the transmission antenna unit 106.
Step 506: Time is waited for until the present time proceeds to T+$\Delta T$ by using the timer 203.
Step 507: T+$\Delta T$ is set as new present time T and program returns to the step 503.

In the above time data generating/transmitting procedures, a random number seed is generated each time that $\Delta T$ has elapsed (step 503) but the same random number seed may be used plural times. When the same random number seed S is used plural times, the first L bytes, for example, of a pseudo-random number series generated by inputting the random number seed S are made to be a pseudo-random number at time T (part of time data), the succeeding L bytes (namely, bytes beginning with the (L+1)-th byte and ending in the 2L-th byte) are made to be a pseudo-random number at time T+$\Delta T$ and the further succeeding L bytes (namely, bytes beginning with the (2L+1)-th byte and ending in the 3L-th byte) are made to be a pseudo-random number at time T+2$\Delta T$, so that, in general, bytes beginning with the $\{(i-1)\times L+1\}$-th byte and ending in the (i$\times$L)-th byte are made to be a pseudo-random number at time T+i$\times\Delta T$. The pseudo-random number generating program 209 utilized in the step 504 in the above process is of a known technique that is detailed in, for example, the aforementioned literature [AC] and a literature [HAC] "Handbook of Applied Cryptography" by Alfred J. Menezes, Paul C. van Oorschot and Scott A. Vanstone, CRC Press Inc., 1997.

The random number seed generated in the step 503 during the above process may be any data if it can be utilized as an input by the pseudo-random number generating program 209, provided that it is hardly obtained by general users or user PC's 103 and is hardly predicted. In a method for generation of the data as above, a random number generator based on the observation of a physical event such as electrical noise, for instance, is connected and used. An example of this type of random number generator is described in the aforementioned literature [AC]. In an alternative, a pseudo-random number generator constructed on the basis of software similar to the pseudo-random number generating program 209 in the present embodiment may be used.

While, in the present embodiment, the random number seed is generated in the step 503 on the basis of the present time acquired in the step 502, random number seeds may precedently be generated in the form of table data which in turn is held in the random number seed storage. In this case, instead of generating and saving a random number seed, data corresponding to the present time may be read out of the precedently generated and held table data in the step 503.

Alternatively, a pseudo-random number based on the acquired current time may be extracted from a single or a plurality of pseudo-random number series generated on the basis of a certain random number seed and the thus extracted pseudo-random number may be used as time data.

The process flow shown in FIG. 5 presumes that the generation and transmission processes of time data are dealt with sequentially by means of the single CPU 201 but in case there are a plurality of CPU's 201 in the time distribution server 102 or the time distribution server 102 includes a plurality of computers, the processes can be dealt with in parallel. For example, the pseudo-random number generating program 209 may be executed with a different CPU 201 or computer in the step 504. When the present time is set to T, by making the input to the pseudo-random number generating program 209 a random number seed corresponding to time T+$\Delta T$, the generation of time data at time T+$\Delta T$ (step 504) and the transmission of time data at time T (step 505) can be executed simultaneously and highly efficiently.

Figure 6:
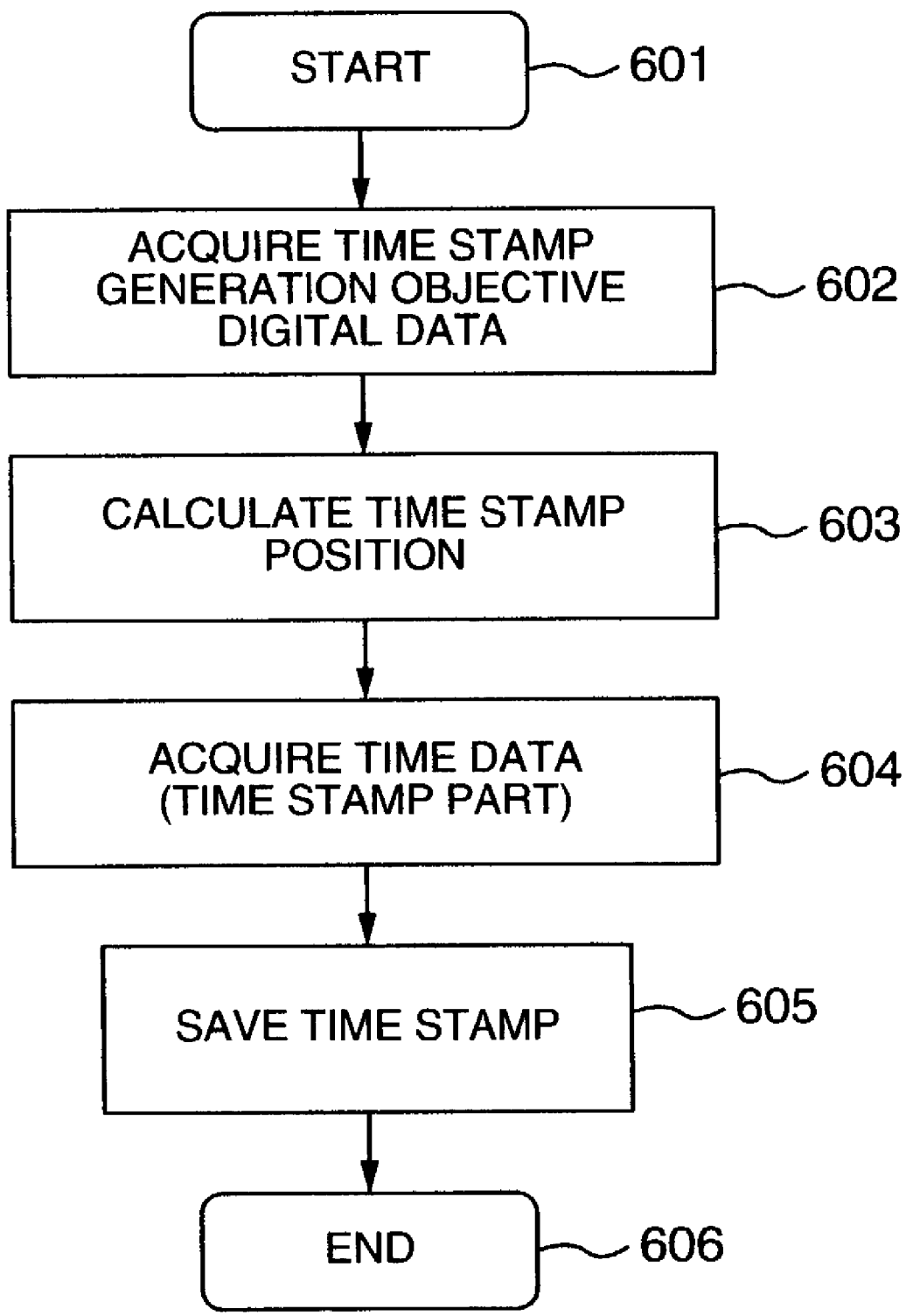
FIG. 6 is a diagram showing a process flow of a time stamp generating process by the user PC in the first embodiment.

FIG. 6 shows a process flow (implemented with the time stamp generating program 308) of a time stamp generating process by the user PC 103 in the present embodiment. Assumptively, a time stamp generated in the present embodiment has a size of $\Delta L$ bytes. The $\Delta L$ may be set to a suitable value depending on requirements demanded by the present system and the security robustness.

Time Stamp Generating Process

Step 601: Start.
Step 602: Data for which a time stamp is generated is acquired.
Step 603: A time stamp position designating function defined in advance as a function common to the whole of the system is used by using the data D as an input to calculate a time stamp position i (integer i that satisfies $0 \leq i \leq L-1$). The time stamp position designating function may be set up by using, for example, a Hash function (for example, a remainder of division of the output value of Hash function by L is defined as a time stamp position).
Step 604: Time data is received through the reception antenna unit 107 and of information contained in the time data, information concerning the present time T and $\Delta L$ bytes beginning with the i-th byte in a pseudorandom number (called partial pseudo-random number or partial time data) are acquired.
Step 605: The data of $\Delta L$ bytes acquired in the step 604 is saved as time stamp TS for digital data D at time T.
Step 606: End.

When each user PC 103 needs to indicate a different user PC 103 that the digital data D is certified for time, each user PC 103 may transmit the digital data D and time stamp TS in combination to the different user PC 103.

The time stamp position designating function referred to in the present embodiment is a function that inputs time certification objective data and outputs a time stamp position for the time certification objective data (that indicates which part of time data the time stamp for the time certification objective data corresponds to). The Hash function is a function for providing an output of fixed length from an input of arbitrary length. Especially, a Hash function, in which input data for providing given output data is difficult to find (one-wayness) and two different kinds of input data for providing the same output are difficult to find (collision resistance), may sometimes called a cryptographic Hash function. The Hash function utilized in the present embodiment is a cryptographic Hash function.

Figure 7:
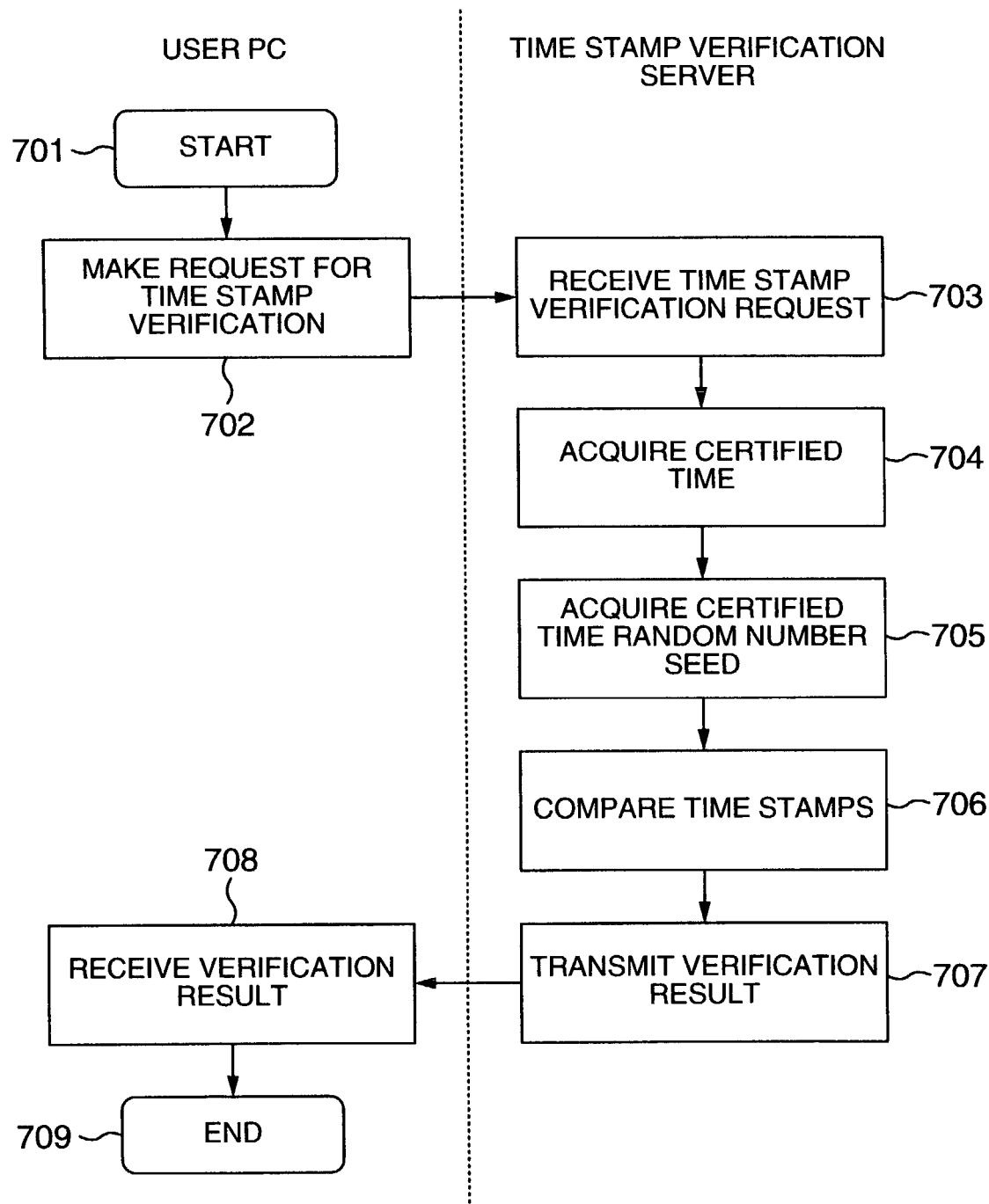
FIG. 7 is a diagram showing a process flow of a time stamp verifying process by the time stamp verification server and user PC in the first embodiment.

FIG. 7 shows a process flow (implemented with the time stamp verification requesting program 309 and time stamp verifying program 407) of a time stamp verifying process by the time stamp verification server 104 and user PC 103. The time stamp to be verified through this verifying process may be one generated by the user PC 103 performing the verifying process or one generated by another user PC 103 and transmitted therefrom (verifiable through similar procedures).

Time Stamp Verifying Process

Step 701: Start.
  (Process by User PC 103)
Step 702: The user PC 103 transmits digital data D and time stamp TS to the time stamp verification server 104 through the network 101 to make a request for verification.
  (Process by Time Stamp Verification Server 104)
Step 703: The time stamp verification server 104 receives the digital data D and time stamp TS from the user PC 103 and starts time stamp verification.
Step 704: The time stamp verifications server 104 acquires information concerning time T certified by the time stamp from the received time stamp TS.
Step 705: A random number seed corresponding to the certified time T is acquired from the random number seed storage (a necessary random number seed has been held in the random number seed storage by executing a random number seed acquiring process to be described later in advance or as necessary).
Step 706: Similarly to the steps 603 to 605 during the time stamp generating process by the user PC 103, data of ΔL bytes is calculated and its value is compared with data contained in the time stamp TS received from the user PC 103. But used as the time data utilized in the step 604 is data obtained by using the random number seed obtained in the step 705 and carrying out calculation similar to that in the step 504 during the time data generating/transmitting process by the time distribution server 102, instead of receiving data from the reception antenna unit 107.
Step 707: If the result of comparison in the step 706 indicates coincidence, a result "verification success" is transmitted to the user PC 103 but if non-coincidence is indicated, a result "verification failure" is transmitted to the user PC 103.
  (Process by User PC 103)
Step 708: The user PC 103 receives the verification result from the time stamp verification server 104.
Step 709: End.

Figure 8:
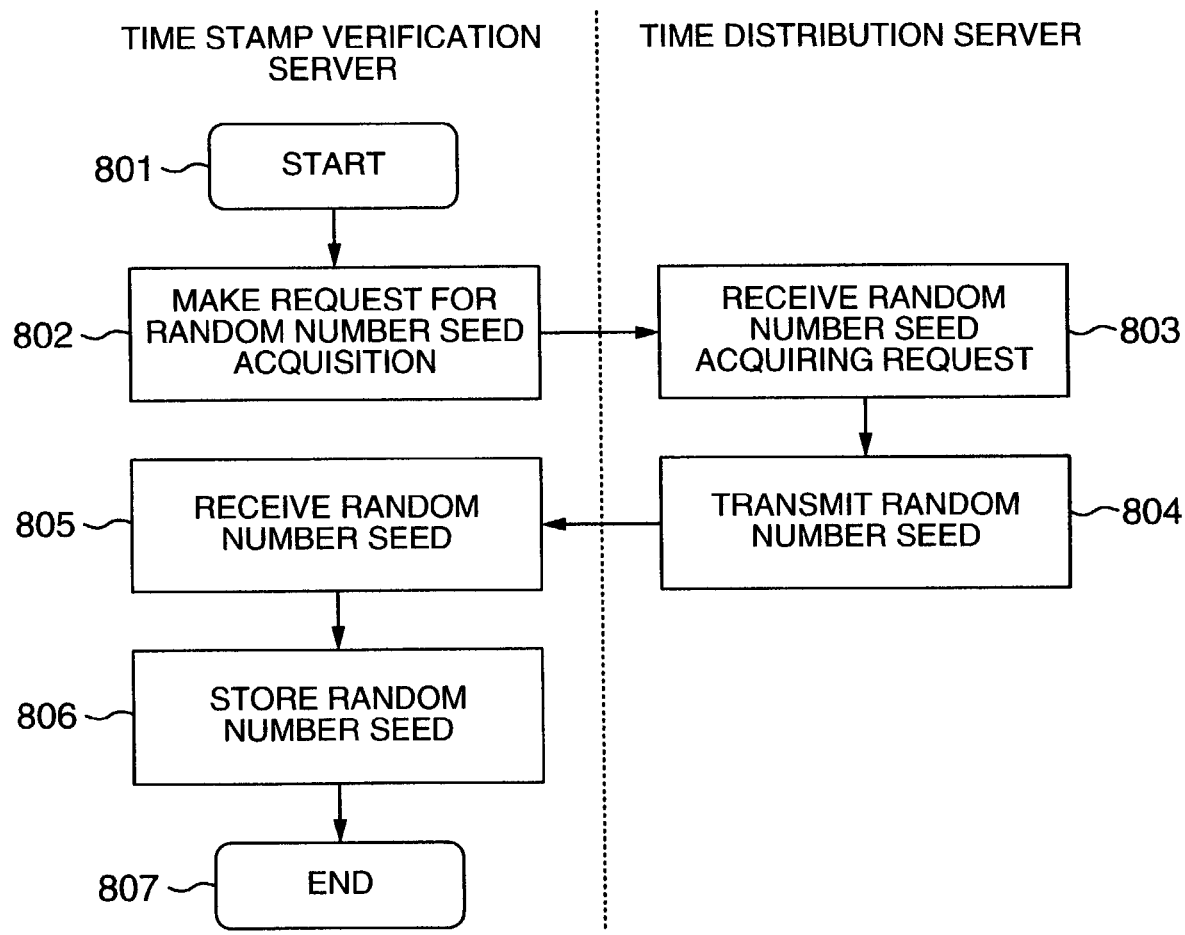
FIG. 8 is a diagram showing a process flow of a random number seed acquiring process by the time stamp verification server and time distribution server in the first embodiment.

FIG. 8 shows a process flow of a random number seed acquiring process implemented with the random number seed acquiring program 408 of time stamp verification sever 104 and the random number seed transmitting program 212 of time distribution server 102. The random number seed acquiring process may be executed periodically in accordance with a rule made in advance between the time stamp verification server 104 and the time distribution server 102 or may be executed when the time stamp verification server 104 demands (for example, in the step 705 during the time stamp verifying process).

Random Number Seed Acquiring Process

Step 801: Start.
  (Process by Time Stamp Verification Server 104)
Step 802: The time stamp verification server 104 makes a request for random number seed acquisition to the time distribution server 102 through the network 101.
  (Process by Time Distribution Server 102)
Step 803: The time distribution server 102 receives the request from the time stamp verification server 104. As necessary, authentication of the time stamp verification server 104 is carried out.
Step 804: The time distribution server 102 selects a random number seed required by the time stamp verification server 104 from the random number seed storage 211 and transmits the selected random number seed to the time stamp verification server 104. A range of necessary random number seed may be designated by the time stamp verification server 104 at the time that the time stamp verification serve 104 makes the acquisition request (step 802) or may be determined in advance between the time stamp verification server 104 and the time distribution server 102. For transmission, it is desirable that countermeasures against wire tapping in the network 101 be taken by taking advantage of encryption or personal line.
  (Process by Time Stamp Verification Server 104)
Step 805: The time stamp verification server 104 receives the random number seed from the time distribution server 102.
Step 806: The time stamp verification server 104 stores the received random number seed in the random number seed storage.
Step 807: End.

In the present embodiment, the random number seed acquiring process is executed on the basis of the request from the time stamp verification server 104 but may be executed in a different way. For example, when the process is executed periodically in accordance with a rule made in advance between the time stamp verification server 104 and the time distribution server 102, the random number seed may be transmitted from the time distribution server 102 without resort to a request from the time stamp verification server 104.

In the present embodiment, the time distribution server 102 is connected to the network 101 so as to interchange information to/from the time stamp verification server 104 through the network 101 but this can be changed. For example, the time distribution server 102 may be connected directly to the time stamp verification server 104, without being connected to the network 101.

Security of the time stamp shown in the present embodiment can be assured as will be described below.

It is now assumed that an unauthorized person is about to newly prepare digital data D, which did not exist at a time point (time T0) in the past, at a time point (time T1) later than the time T0 and tell such a lie that the digital data D already existed at the time T0. In order for the person to succeed in the forgery, "a time stamp TS for the digital data D at the time T0" must be generated later at the time T1. Namely, the attacker must be able to utilize, at the time T1, partial data of time data at the time T0 that corresponds to the digital data D. However, since the digital data D did not exist at the time T0, it was impossible to determine at the point of time T0 which partial data corresponded to the digital data D. Accordingly, unless the unauthorized person memorized the whole of time data distributed at the time T0, the unauthorized person cannot utilize the partial data necessary for forgery at the time T1. But the whole of time data has a very large data size and is difficult to memorize. From the above, difficulties in forging the time stamp can be demonstrated.

According to the present embodiment, a secure time stamp technique can be provided which permits the user PC 103 per se to generate a time stamp. Through this, the processes can be prevented from being concentrated on the TSA and a time stamp can be generated without delay from a time point the user PC 103 demands.

Further, since in the present embodiment the time data is distributed through a broadcast utilizing satellite communication, the equality of time information distributed to the user PC's 103 can be maintained to advantage. If a high-speed wired communication environment capable of keeping the equality of time data can be provided, it can also be utilized.

According to the present embodiment, a safe time stamp technique can be provided which permits the user side to generate a time stamp.

(2) Second Embodiment

A second embodiment of the invention will be described hereunder with reference to the accompanying drawings.

In the first embodiment set forth so far, the time data generated by the time distribution serve 102 is broadcast by utilizing the artificial satellite 105 but in the present embodiment, time data generated by the time distribution server 102 is transmitted through the network 101 in accordance with a request from the user PC 103. Through this, transmission of a large amount of data by way of the satellite communication is unneeded to permit cost reduction and since the time data is not broadcast, danger of time stamp counterfeit by an unauthorized use of the time data can further be mitigated.

The schematic diagram of a system to which the embodiment of the invention is applied is essentially the same as that of FIG. 1 but in the present embodiment, the artificial satellite 105 and the antenna unit connected to each component can be unneeded.

A time distribution server 102 in the present embodiment essentially has the same construction as that of FIG. 2 but in the present embodiment, the transmission antenna unit 106 is excluded. Further, in the present embodiment, the time distribution server 102 transmits necessary time data after receiving a request from the user PC 103 and therefore, a time data distributing program 210 differs from that in the first embodiment.

A user PC 103 in the present embodiment essentially has the same construction as that of FIG. 3 but in the present embodiment, the reception antenna unit 107 is excluded. Further, in the present embodiment, the user PC 103 makes a request for necessary data to the time distribution server 102 at the time of generation of a time stamp and therefore a time stamp generating program 308 differs from that in the first embodiment.

A time stamp verification server 104 in the present embodiment is constructed similarly to FIG. 4.

Figure 9:
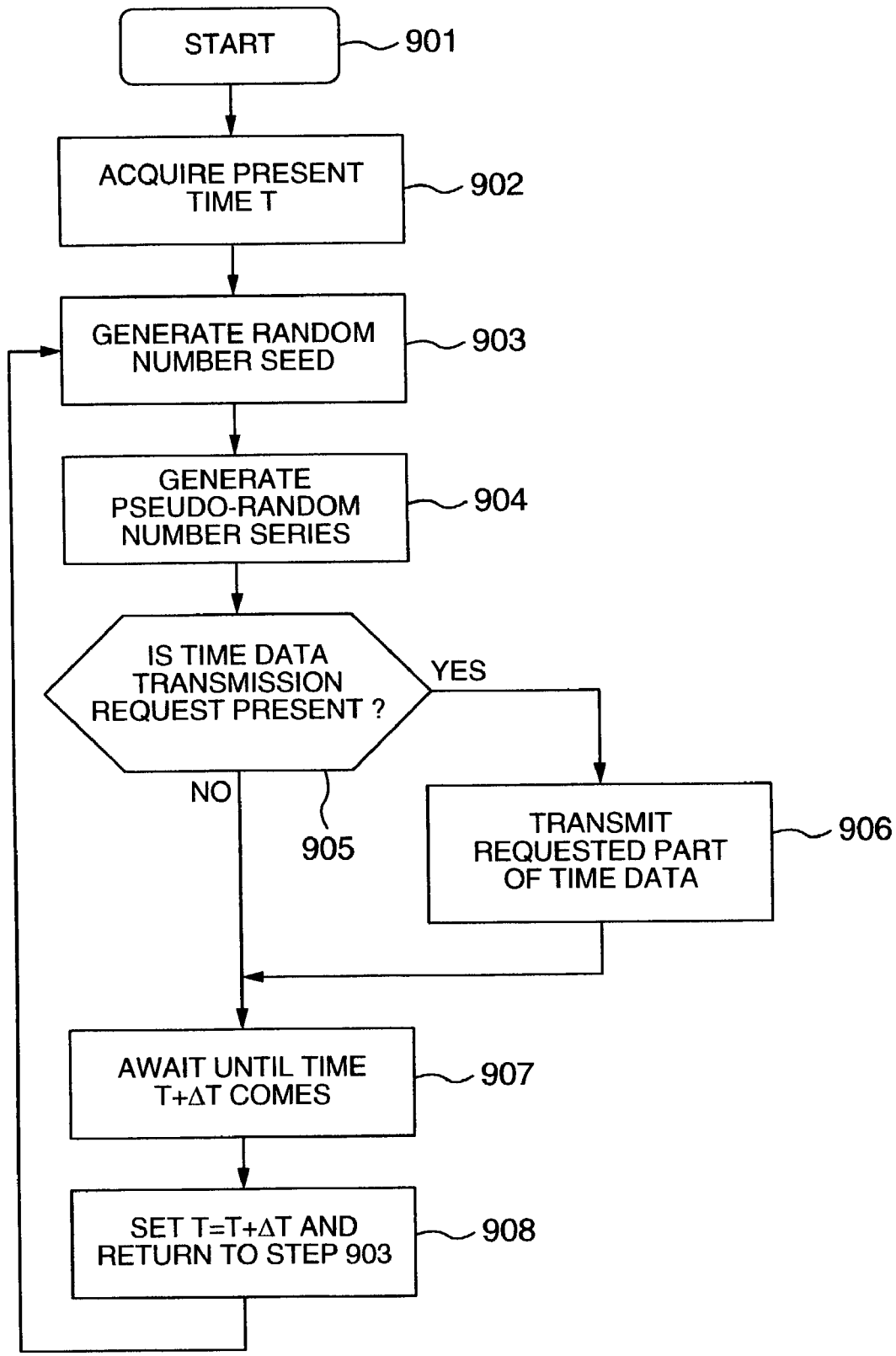
FIG. 9 is a diagram showing a process flow of a time data generating/transmitting process by the time distribution server in a second embodiment.

FIG. 9 shows a process flow of a time data generating/transmitting process by the time distribution server 102 in the present embodiment.

Time Data Generating/transmitting Process

Step 901: Start.
Step 902: Similar to the step 502.
Step 903: Similar to the step 503.
Step 904: Similar to the step 504.
Step 905: It is examined whether there is a time data transmission request from the user PC 103. In the presence of the request, the program proceeds to step 906. In the absence of the request, the program proceeds to step 907.
Step 906: Of time data at time T obtained similarly to the step 505, a requested partial pseudo-random number is transmitted as a time stamp to the user PC 103.
Step 907: Similar to the step 506.
Step 908: The program returns to the step 903.

Figure 10:
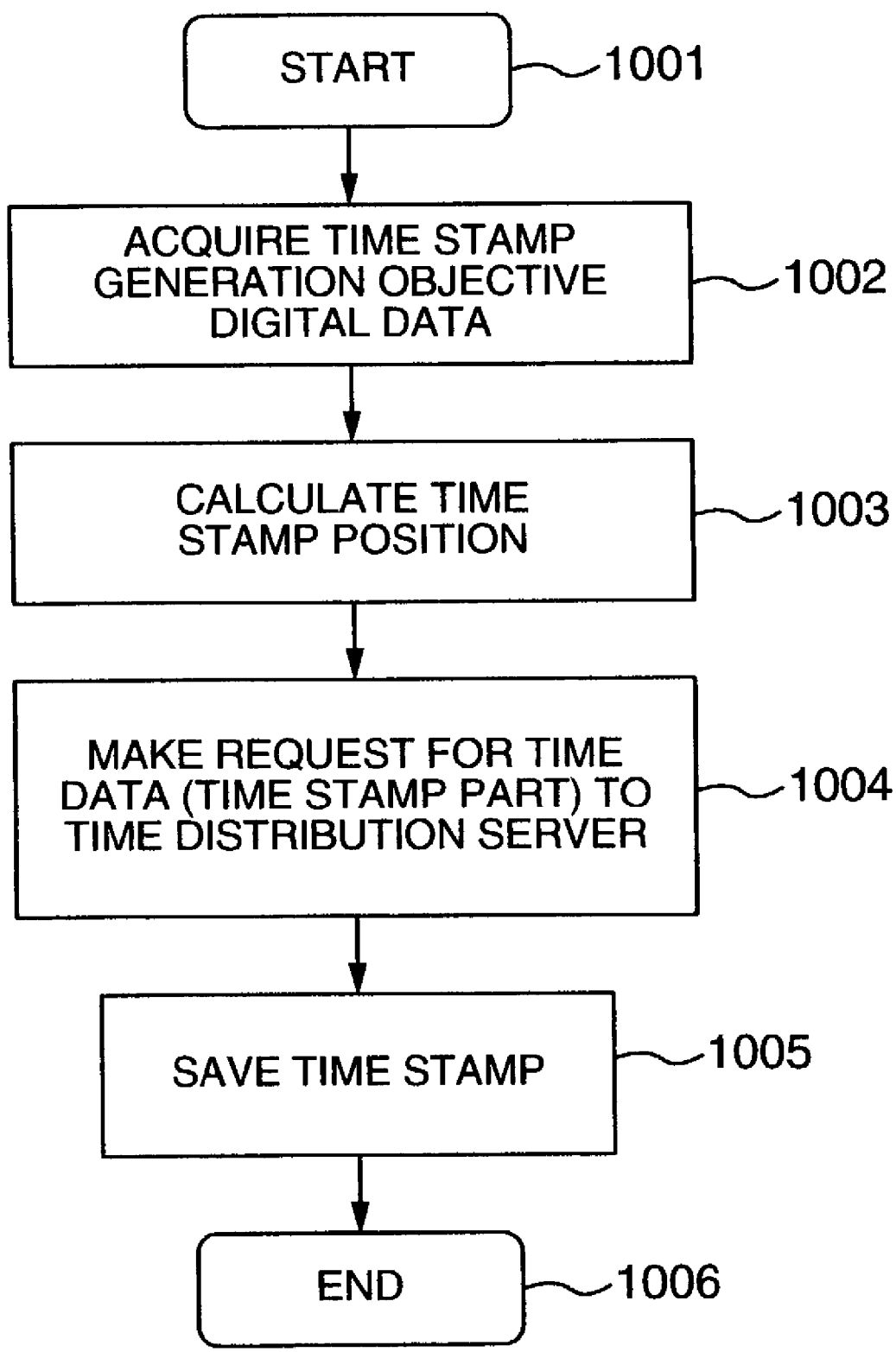
FIG. 10 is a diagram showing a process flow of a time stamp generating process by the user PC in the second embodiment.

FIG. 10 shows a process flow of a time stamp generating process by the user PC 103 in the present embodiment.

Time Stamp Generating Process

Step 1001: Start.
Step 1002: Similar to the step 602.
Step 1003: Similar to the step 603.
Step 1004: On the basis of the time stamp position obtained in the step 1003, information concerning the present time T and a partial pseudo-random number for ΔL bytes beginning with the i-th byte in the pseudorandom number are requested to the time distribution server 102 through the network 101 and they are obtained.
Step 1005: Similar to the step 605.
Step 1006: End.

A process flow of a time stamp verifying process by the time stamp verification server 104 and user PC 103 in the present embodiment is similar to that in FIG. 7. Further, a process flow of a random number seed acquiring process by the time stamp verification server 104 and time distribution server 102 in the present embodiment is similar to that in FIG. 8.

Since in the present embodiment a part extracted as a time stamp from the time data generated by the time distribution server 102 is transmitted in accordance with a request from the user PC 103 through the network 101, transmission of a large amount of data by satellite communication is dispensed with, thus making it possible to reduce the costs. In addition, the size of the whole of time data corresponding to a certain time point can be increased. This is because only a requested part of the time data needs to be transmitted onto the network 101 and the time data need not be transmitted continuously.

In the present embodiment, an inquiry from the user PC 103 to the time distribution server 102 is made or generated and therefore, in contrast to the first embodiment, part of the time stamp generating process depends on the response performance of the time distribution server 102. However, of processes by the time distribution server 102 in the present embodiment, a process for generation of time data (namely, pseudo-random number) that is executable regardless of a request from the user imposes the highest load. But, even the load of this process is lower than that of a generation process which is activated each time that a request is made from the user and which imposes the highest load in the conventional time stamp technique (for example, a digital signature generating process). Accordingly, according to the present embodiment, the time stamp can be generated without delay from the time requested by the user PC 103.

While in the present embodiment the single time distribution server 102 is employed but a plurality of time distribution servers 102 may be used. For example, the output of the time stamp position designating function for calculating a time stamp position in correspondence with digital data D may include information for designating which of the plurality of time distribution servers 102 is to be inquired.

By providing the plurality of time distribution servers in this manner, processes can be dispersed and the load on each server can be alleviated. Further, the data size necessary for an unauthorized person to succeed in forging a time stamp increases further and this is preferable from the standpoint of safety.

Also, according to the present embodiment, a safe time stamp technique permitting the user side to generate a time stamp can be provided.

(3) Third Embodiment

In the event that an unauthorized person is about to forge an old time stamp, information to be memorized in advance is the whole of time data corresponding to a forgery time point in the foregoing first and second embodiments. According to the present embodiment, the size of information to be memorized in advance by the unauthorized person in order for the unauthorized person to forge the old time stamp can be further increased and consequently, the illegality is more difficult to commit.

In the present embodiment, a system schematic diagram and the construction of each of time distribution server 102, user PC 103 and time stamp verification server 104 are similar to those of the first embodiment.

In the present embodiment, a process flow of a time data generating/transmitting process by the time distribution server 102 (implemented by the time data distributing program 210) and a process flow of a random number seed acquiring process by the time stamp verification server 104 and time distribution server 102 (implemented by the random number seed acquiring program 408 and random number seed transmitting program 212) are similar to those in the first embodiment.

Figure 11:
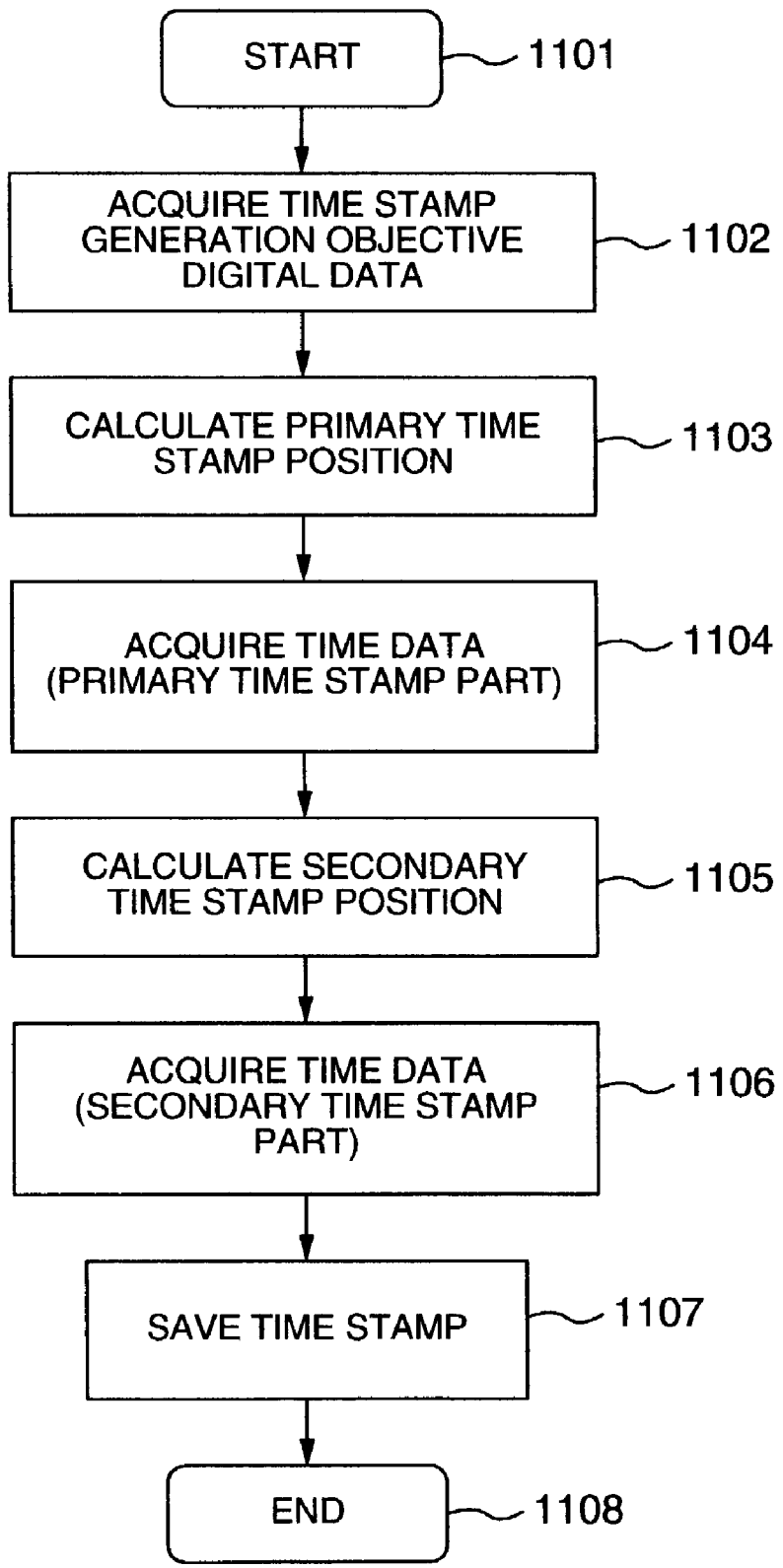
FIG. 11 is a diagram showing a process flow of a time stamp generating process by the user PC in a third embodiment.

FIG. 11 shows a process flow (implemented by the time stamp generating program 308) of a time stamp generating process by the user PC 103 in the present embodiment.

Time Stamp Generating Process

Step 1101: Start.
Step 1102: Data D for which a time stamp is generated is obtained.
Step 1103: A primary time stamp position designating function defined in advance as a function common to the whole of the system is used by using the data D as an input to calculate a primary time stamp position (integer i satisfying $0 \leq i \leq L-1$).
Step 1104: Time data is received through the reception antenna unit 107 and of information contained in the time data, information concerning the present time T and $\Delta L$ bytes beginning with the i-th byte in a pseudo-random number are acquired as a partial pseudo-random number (this is called a primary time stamp)
Step 1105: A secondary time stamp position designating function defined in advance as a function common to the whole of the system is used by using the data D and primary time stamp as an input to calculate a secondary time stamp time $T^{(2)}$ ($T<T^{(2)} \leq T+\Delta T^{(2)}$) and a secondary time stamp position (integer j satisfying $0 \leq j \leq L^{(2)}-1$)
Step 1106: When time $T^{(2)}$ comes, time data is received through the reception antenna unit 107 and of information contained in the time data, $\Delta L^{(2)}$ bytes beginning with the j-th byte in the pseudo-random number is acquired as a partial pseudo-random number (this is called a secondary time stamp).
Step 1107: The primary time stamp obtained in the step 1104 and the secondary time stamp obtained in the step 1106 are saved as a time stamp TS for the digital data D at time T.
Step 1108: End.

Figure 12:
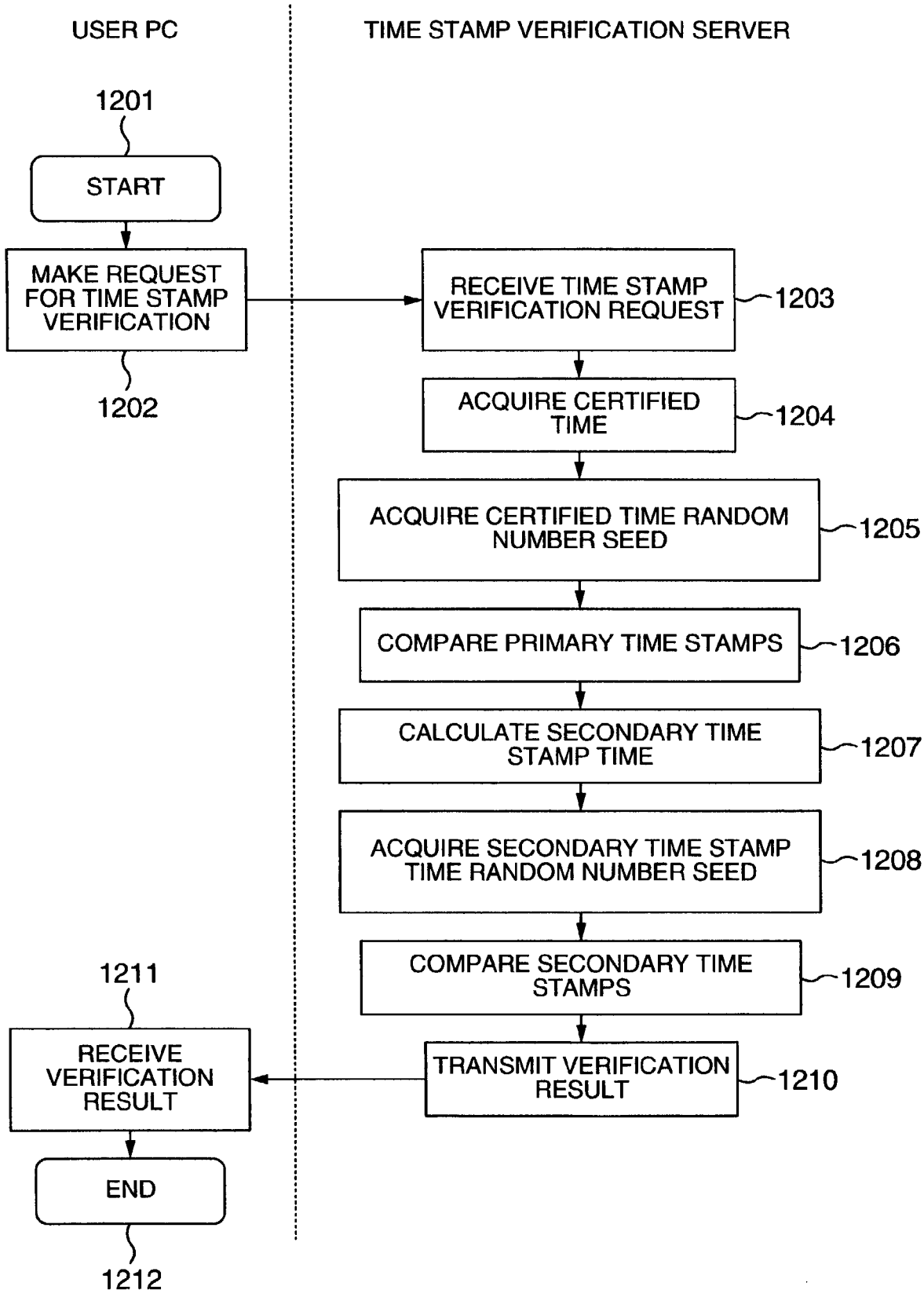
FIG. 12 is a diagram showing a process flow of a time stamp verifying process by the time stamp verification server and user PC in the third embodiment.

FIG. 12 shows a process flow (implemented by the time stamp verification requesting program 309 and time stamp verifying program 407) of a time stamp verifying process by the time stamp verification server 104 and user PC 103 in the present embodiment.

Time Stamp Verifying Process (Process by the User PC 103)
Step 1201: Start.
Step 1202: The user PC 103 transmits digital data D and time stamp TS to the time stamp verification server 104 through the network 101 to request a verification.
(Process by the Time Stamp Verification Server 104)
Step 1203: The time stamp verification server 104 receives the digital data D and time stamp TS from the user PC 103 and starts the time stamp verification.
Step 1204: The time stamp verification server 104 acquires information concerning the time T certified by the time stamp from the received time stamp TS.
Step 1205: The random number seed corresponding to the certified time T is acquired from the random number seed storage 212 (the necessary random number seed is held in advance in the random number seed storage 211 by executing a random number seed acquiring process to be described later in advance or as necessary).
Step 1206: Data of $\Delta L$ bytes is calculated in a manner similar to that in the steps 1103 to 1104 during the time stamp generating process by the user PC 103 and its value is compared with the primary time stamp contained in the time stamp TS received from the user PC 103. But used as the time data utilized in the step 1104 is data obtained, instead of receiving data from the reception antenna unit 107, by using the random number seed acquired from the step 1205 and performing calculation similarly to the step 504 during the time data generating/transmitting process by the time distribution server 102.
Step 1207: Similarly to the step 1105 during the time stamp generating process by the user PC 103, the digital data D and primary time stamp are inputted to calculate the secondary time stamp time $T^{(2)}$.
Step 1208: The random number seed corresponding to the secondary time stamp time $T^{(2)}$ is acquired from the random number seed storage 211.
Step 1209: Similarly to the steps 1105 to 1106 during the time stamp generating process by the user PC 103, data of $\Delta L^{(2)}$ bytes is calculated and its value is compared with the secondary time stamp contained in the time stamp TS received from the user PC 103. But used as the time data utilized in the step 1106 is data obtained, instead of receiving data from the reception antenna unit 107, by using the random number seed acquired from the step 1208 and performing calculation similarly to the step 504 during the time data generating/transmitting process by the time distribution server 102.

Step 1210: If the results of the comparisons in the steps 1206 and 1209 indicate coincidence, a result "verification success" is transmitted to the user PC 103 but if the comparison result in at least one of the steps indicates non-coincidence, a result "verification failure" is transmitted to the user PC 103.

(Process by User PC 103)

Step 1211: The user PC 103 receives the verification result from the time stamp verification server 104.

Step 1212: End.

As described above, in the present embodiment, pieces of time data at two time points are utilized. More particularly, time data at a point of time for requesting a time stamp for digital data D is first received and subsequently, time data at a different time point designated by a value calculated on the basis of the received time data and the digital data D is received. These pieces of data are put together to define a time stamp. Through this, the size of information to be memorized in advance in order for an unauthorized person to succeed in forging an old time stamp increases drastically. In other words, in order for the unauthorized person to forge a time stamp at a certain time point T, the unauthorized person needs not only time data at the time point T but also time data at a different time point after a constant time has passed. Here, a prediction as to what time "a different time point after a constant time has passed" stands for cannot be made in advance because of dependency on the digital data D and the time data at the time point T. Accordingly, in order for the unauthorized person to succeed in forging the time stamp at the time point T, there need the whole of time data at the time T and the whole of time data at all time points having the possibility that they will be designated after the time T. Storage of these data is more difficult than that in the first embodiment. To add, in the present embodiment, pieces of time data at the two time points are to be referred to but by repeating a similar process, pieces of time data at three or more time points may be referred to.

The present embodiment is based on the foregoing first embodiment but may also be applicable to the second embodiment in a similar way. In other words, the time data may be obtained by making a request for it to the time distribution server 102. In an alternative, time data to be referred to firstly may be obtained through broadcast using the artificial satellite 105 as in the case of the first embodiment and time data to be referred to secondly may be obtained by making an inquiry to the time distribution server 102 as in the case of the second embodiment.

Further, the time distribution server 102 for distributing the time data to be referred to firstly may differ from the time distribution server 102 for distributing the time data to be referred to secondly. In this case, it is preferable that temporal synchronization be assured between the time distribution server 102 for making the first reference and the time distribution server 102 for making the second reference through any methods. For synchronization, a method may be employed in which when, for example, the time distribution server 102 for making the first reference broadcasts time data by using the artificial satellite 105 and the time distribution server 102 for making the second reference transmits a necessary part in accordance with a request from the user PC 103 via the network 101, the time data generated by the time distribution server 102 for making the second reference may be so designed as to depend on the time data broadcast via the artificial satellite 105.

Furthermore, there may be provided a plurality of time distribution servers 102 for making the second reference. In this case, by so designing the secondary time stamp position designating function, for instance, as to calculate a secondary time stamp acquiring server ID in addition to the secondary time stamp time and secondary time stamp position, it may be determined which of the plurality of existing time distribution servers 102 is utilized. This further increases the data size necessary for the unauthorized person to forge data in accordance with the number of time distribution servers 102, thus making the forgery more difficult.

Figure 13:
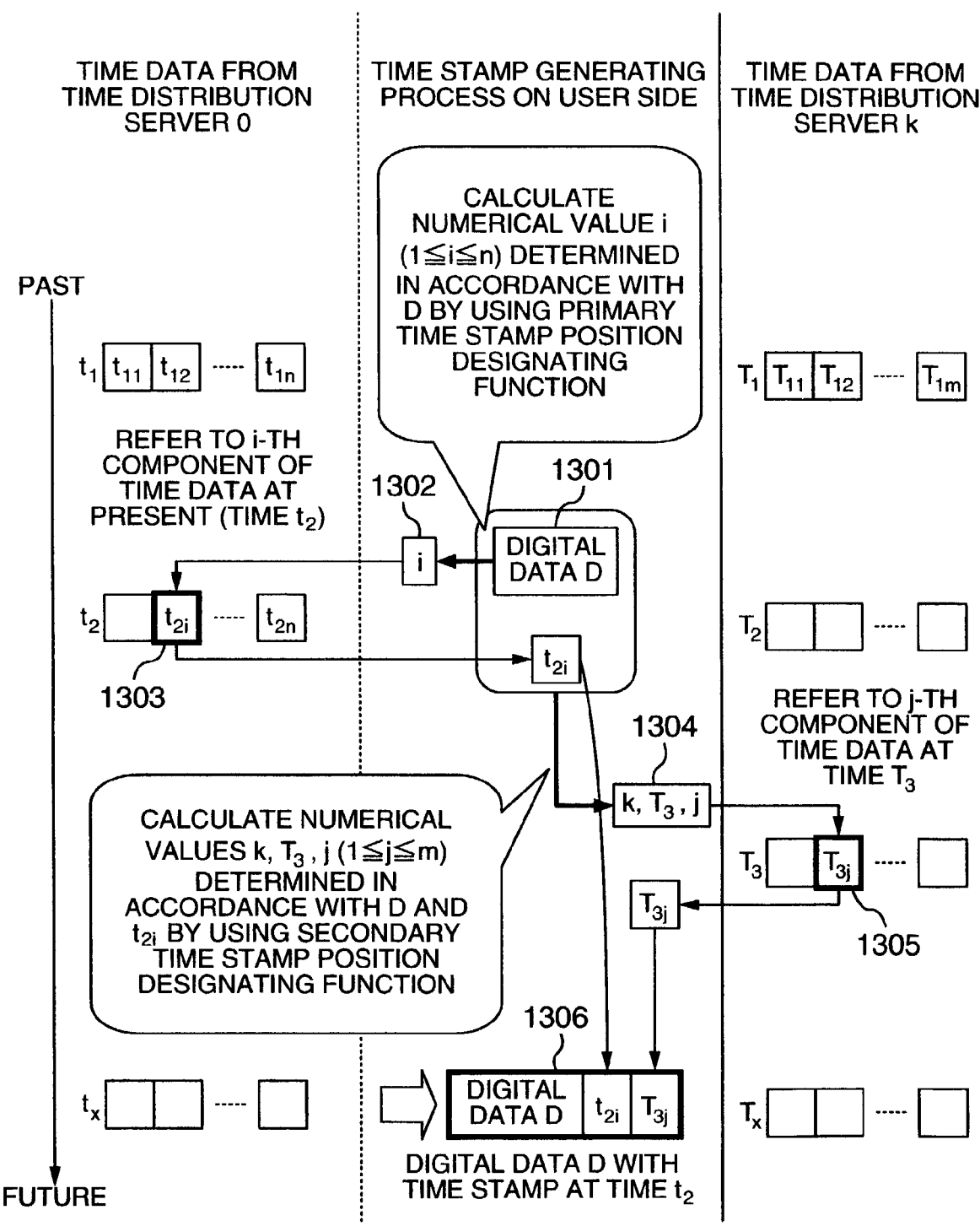
FIG. 13 is a diagram useful to diagrammatically explain a time stamp generating process when there are provided in the third embodiment a plurality of time distribution servers to be referred to for the second time.

FIG. 13 diagrammatically explains a time stamp generating process when there are a plurality of time distribution servers 102 for making the second reference.

A time distribution server 1020 for making the first reference and a plurality of existing time distribution servers 102 for making the second reference (in the drawing, only a time distribution server 102k is shown as a representative) generate time data ($t_1$ to $t_x$) and time data ($T_1$ to $T_x$), respectively, at respective time points. When the user PC 103 generates a time stamp for digital data D 1301 at time $t_2$, it first calculates a primary time stamp position i 1302 determined in accordance with the D by using the primary time stamp position designating function, acquires partial time data designated by i and defines the acquired partial time data as a primary time stamp $t_{2i}$ 1303. Next, the user PC 103 uses the secondary time stamp position designating function to calculate a set 1304 of secondary time stamp acquiring server ID (k) determined in accordance with the D and $t_{2i}$, secondary time stamp time ($T_3$) and secondary time stamp position (j), acquires partial time data designated by the set and defines the set as a secondary time stamp $T_{3j}$ 1305. The digital data D 1301, primary time stamp $t_{2i}$ 1303 and secondary time stamp $T_{3j}$ 1305 are put together to provide digital data with time stamp at the time $t_2$.

In the present embodiment, of the time data generated on the side of time distribution server 102, the partial time data designated in accordance with the time certification objective digital data can be acquired by the user PC 103 and time certification for the digital data can be attained.

Further, by providing a plurality of time distribution servers 102 at geographically different positions and designing each time distribution server 102 such that it can be utilized from only a user PC 103 within a constant geographical distance, the digital data can also be certified for its geographically existing position at that time point. In order to design the plurality of time distribution servers 102 such that they are provided at geographically different positions and can be utilized from only the user PC 103 within a geographically constant distance, a base station of mobile communication such as PHS (Personal Handy-phone System), for instance, may be provided with the function of time distribution server 102. This ensures that only a user PC 103 in the range to which an electric wave from the base station can reach can utilize time data from the base station, thus realizing the above idea.

Further, the time distribution server 102 may add to the time data a unique identifier for identifying the time distribution server 102 or geographical position information or position information on the network. This makes it possible to identify which time distribution server the time data comes from.

In the present embodiment, the time stamp position designating function is used which is defined in advance as a function common to the whole of the system. Then, a time stamp position is calculated from the time certification objective data and ΔL bytes beginning with the time stamp position in the time data are defined as a time stamp.

But, differing from the above, n time stamp position designating functions may be used in advance. In this case, n time stamp positions are calculated from time certification objective data and data of ΔL bytes corresponding to the individual n time stamp positions are extracted from time data. Then, n pieces of data are exclusive-ORed (XOR) to provide a time stamp. Alternatively, the data are further exclusive-ORed to result in a Hash value that is used as a time stamp.

Further, according to the present embodiment, a safe time stamp technique capable of generating a time stamp on the user side can be provided.

According to the present invention, processes can be prevented from being concentrated on a specified time distribution server and a time stamp less delayed from a time point requested by the user can be generated.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A time stamp generating system comprising:
a time distribution server; and
a user PC that holds time certification objective data,
wherein said time distribution server repeatedly generates time data corresponding to a time point and independent from the time certification objective data, and repeatedly distributes said time data; and
said user PC computes time stamp generating data by using said time certification objective data as an input in a predetermined manner, acquires the time data based on an intended time point, distributed from said time distribution server, and generates a time stamp on the basis of said time data and said time stamp generating data computed by using the time certification objective data as an input.

2. A time stamp generating system according to claim 1, wherein said time distribution server generates a pseudo-random number series calculated from a seed value without regard to the time certification objective data and when generating said time data, extracts a pseudo-random number of a predetermined length corresponding to said time point from said pseudo-random number series to provide said time data which is independent from the time certification objective data.

3. A time stamp generating system according to claim 1, wherein said user PC calculates time stamp generating data by using the time certification objective data as an input and when obtaining said time stamp, acquires partial data of said time data, which partial data is designated by said time stamp generating data, to provide the acquired partial data as said time stamp.

4. A time stamp generating system according to claim 1, wherein said time distribution server transmits time data generated depending on the present time to a plurality of user PC's by using a broadcasting communication path.

5. A time stamp generating system according to claim 1, wherein said user PC calculates a secondary time stamp acquiring time and secondary time stamp generating data on the basis of said acquired time data and time certification objective data, and processes said time data at the secondary time stamp acquiring time on the basis of the secondary time stamp generating data to obtain a secondary time stamp.

6. A time stamp generating system according to claim 5, wherein when calculating the secondary time stamp acquiring time and secondary time stamp generating data, said user PC further calculates secondary time distribution server designating data and when acquiring said time data, said user PC obtains secondary time data from the secondary time distribution server designating data.

7. A time stamp generating system according to claim 1, wherein when generating said time data, said time distribution server adds position information of said time distribution server.

8. A time stamp generating system comprising:
a time distribution server; and
a user PC that holds time certification objective digital data,
wherein said user PC computes time stamp generating data by using the time certification objective data as an input in a predetermined manner and transmits said time stamp generating data to said time distribution server; and
said time distribution server repeatedly generates time data corresponding to a time point and independent from the time certification objective digital data, receives said time stamp generating data from said user PC, processes said time data on the basis of said time stamp generating data to obtain a time stamp, and repeatedly transmits said time stamp to said user PC.

* * * * *